(Model.) 3 Sheets—Sheet 1.

A. RUNSTETLER.
Corn Planter.

No. 238,160. Patented Feb. 22, 1881.

Witnesses
Fred. G. Dieterich
A. A. Krause

Inventor
Andrew Runstetler
By W. B. Richards
atty (Model.)

3 Sheets—Sheet 2.

A. RUNSTETLER.
Corn Planter.

No. 238,160.

Patented Feb. 22, 1881.

Witnesses
Fred G. Dieterich
A H Krause

Inventor.
Andrew Runstetler
By W. B. Richards
Atty (Model.)  3 Sheets—Sheet 3.

A. RUNSTETLER.
Corn Planter.

No. 238,160. Patented Feb. 22, 1881.

Witnesses
Fred. G. Dietrich
A. H. Krause

Inventor
Andrew Runstetler
By W. B. Richards
atty

UNITED STATES PATENT OFFICE.

ANDREW RUNSTETLER, OF MOLINE, ILLINOIS, ASSIGNOR TO FARMERS FRIEND MANUFACTURING COMPANY, OF DAYTON, OHIO.

CORN-PLANTER.

SPECIFICATION forming part of Letters Patent No. 238,160, dated February 22, 1881.

Application filed November 22, 1880. (Model.)

*To all whom it may concern:*

Be it known that I, ANDREW RUNSTETLER, a citizen of the United States, residing at Moline, in the county of Rock Island and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 5:
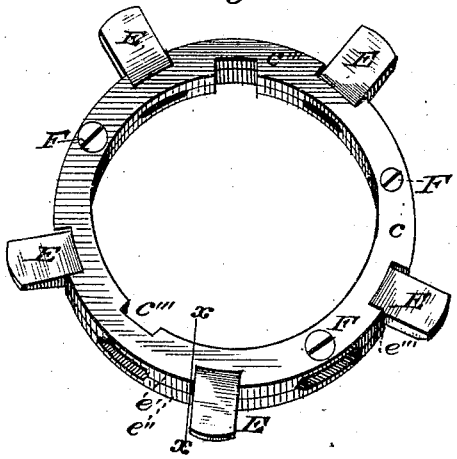
Figure 7:
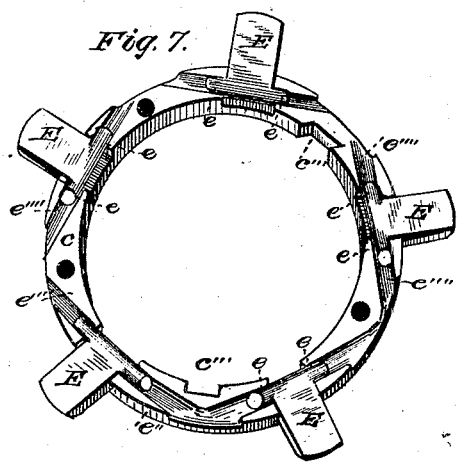
Figure 6:
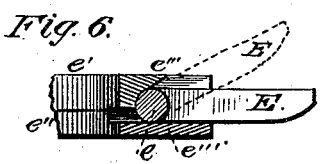
Figure 9:
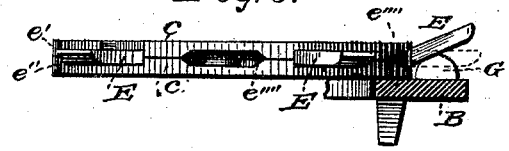
Figure 8:
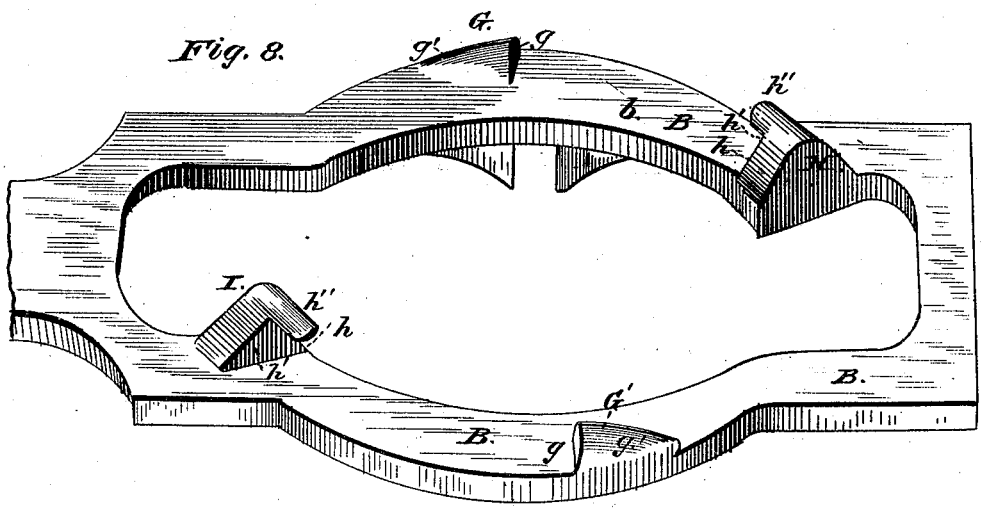
Figure 10:
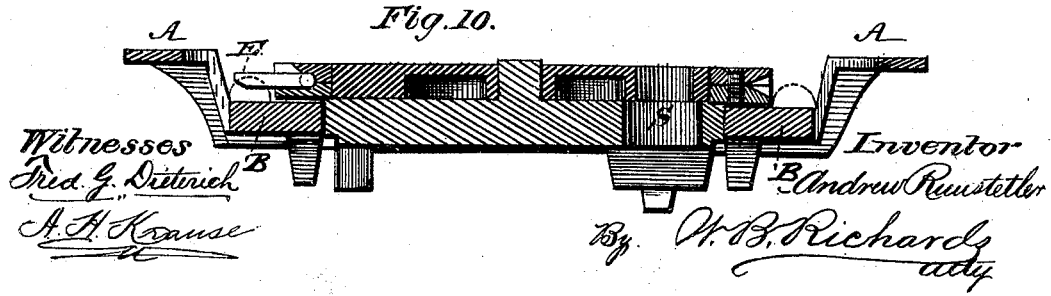

Figures 1, 2, 3, and 4 are top plans of the seed-cup disk or wheel and slide, shown in different operative positions on the seed-box bottom in each of said figures. Fig. 5 is a perspective of the outer ring or portion of the seed-cup disk. Fig. 6 is a sectional elevation in the line $xx$ in Fig. 5. Fig. 7 is a perspective of the lower half of Fig. 5. Fig. 8 is a perspective of the slide. Fig. 9 is a side elevation, partly in section, showing a hinged lug of the disk passing over a lug or tappet on the slide. Fig. 10 is a sectional elevation in the line $yy$ in Fig. 1.

This invention relates to corn-planter seeding devices of that class in which a seed-cup wheel or disk is actuated by a reciprocating slide, which slide has lugs, pawls, or other projections that coact with lugs or projections on the seed-cup wheel for imparting an intermittent rotary motion in one direction to said seed-cup wheel.

In seeding devices of this class as heretofore constructed the seed-cup-wheel lugs, upon which the lugs or pawls or tappets on the slide act, have been rigidly secured to the seed-wheel; and the main feature in my invention consists in the hinged or otherwise connected to the seed-cup wheel, so that they may yield to pass over the actuating lugs or tappets on the slide.

The invention further consists in combinations and constructions of parts hereinafter described, and set forth in the claims hereto annexed.

Referring to the drawings by letters, A represents an ordinary bottom plate of a corn-planter seed-box with a grooved way, in which a slide-bar, B, may be reciprocated in the usual manner. The slide B is of that class having two limbs or side bars, $b\ b'$.

C is the seed-cup wheel or disk, formed of an outer ring or annular part, $c$, and a central part, $c'$, which fits therein, and is held by studs $c''$, which rest in corresponding notches $c'''$ in the ring $c$. The part $c'$ contains seed-cup holes or chambers $d$ and a central hole, $d'$, which receives a stud-journal, D, that projects upward from the bottom A, and on which the seed-cup wheel is rotated. Similar lugs, E E' E'' E''' E'''', project radially from the periphery of the ring $c$, and are provided with trunnions $e$ on their sides and near their inner ends, by means of which they are hinged or articulated to said ring $c$, so that they may swing or tilt upwardly. The part $c$ is made in two parts—an upper part, $e'$, and lower part, $e''$—held together by screw-bolts F. The adjacent faces of the parts $e'\ e''$ have recesses $e'''$, in which the swinging lugs are seated, as shown at Figs. 5, 6, and 7, and have grooves $e''''$, which constitute the bearings for the trunnions $e$. The grooves or bearings $e''''$ extend outward to the periphery of the part $c$, as shown at Figs. 5 and 7, so that a file or other tool may be used to dress them after the parts $c\ c'$ are connected to each other. The recesses $e'''$ in the lower plate, $e''$, have horizontal bottoms, which sustain the swinging lugs horizontally when in their lowest and normal positions, as shown by full lines at Fig. 6. The recesses $e'''$ in the plate $e'$ are cut away, as shown at Fig. 5, to permit the swinging lugs to rise at their outer ends, as shown by dotted lines at Fig. 6. The swinging lugs may be differently formed from what I have shown them in the annexed drawings, and may be otherwise hinged to the seed-cup wheel; and the annular plate $c$ may be formed in sections, as I have shown and described it, or it may be formed in one piece, or in more than two sections, if desired. I think it preferable, however, to make the plate $c$ in two sections, as herein described, to facilitate seating and removing the hinged lugs.

The plates $c$ and $c'$ may be integral or formed of one piece of metal; but I prefer making them of separate plates, so that series of plates $c'$, with different-sized seed-chambers $d$, may be furnished with each machine by the manufacturer without the expense of furnishing more than one annular plate, $c$, for each seed-box.

G is a lug or tappet on the upper face of the limb $b'$ of the slide B, and has a face or side, $g$, about perpendicular to the slide, and an inclined side, $g'$. G' is a lug or tappet on the limb $b'$, similar to the lug G. The lugs or tappets G G' have their inclined sides in opposite directions to each other, as also are their perpendicular sides.

H is a lug at one end of the slide-arm $b$, and has an inclined side, $h$, next the seed-wheel C, and a side, $h'$, perpendicular to the slide B. A stud, $h''$, projects laterally from the side $h'$ of the lug H.

I is a lug, similar to the lug H, but located on the limb $b'$ of the slide at the opposite side of the seed-wheel from the lug H.

Figure 1:
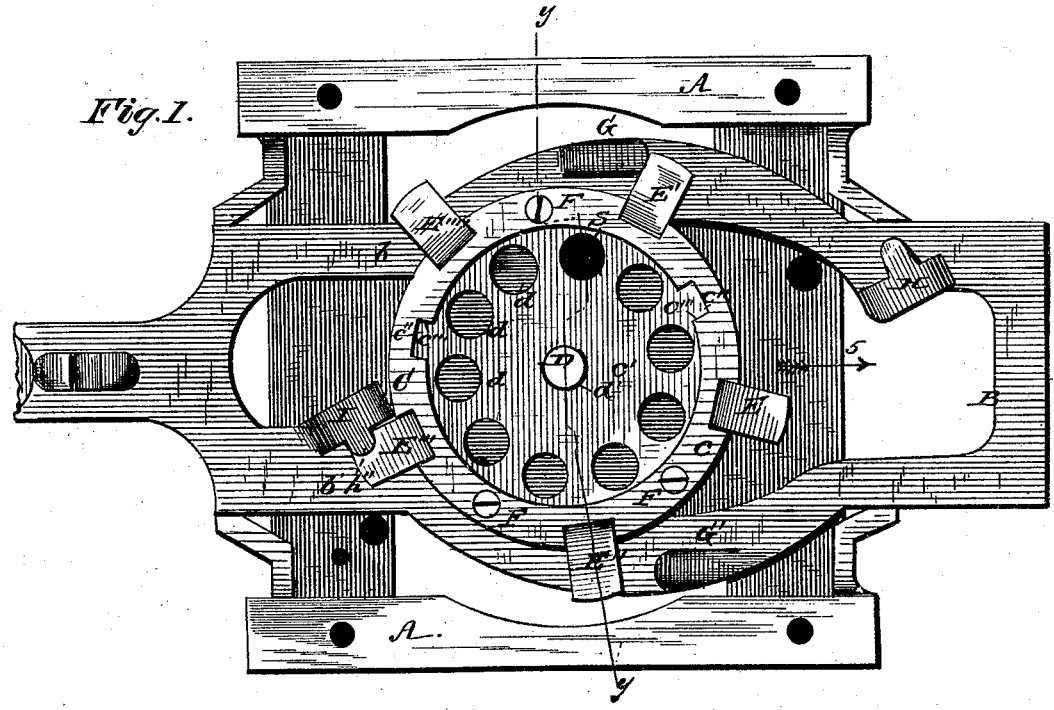
Figure 2:
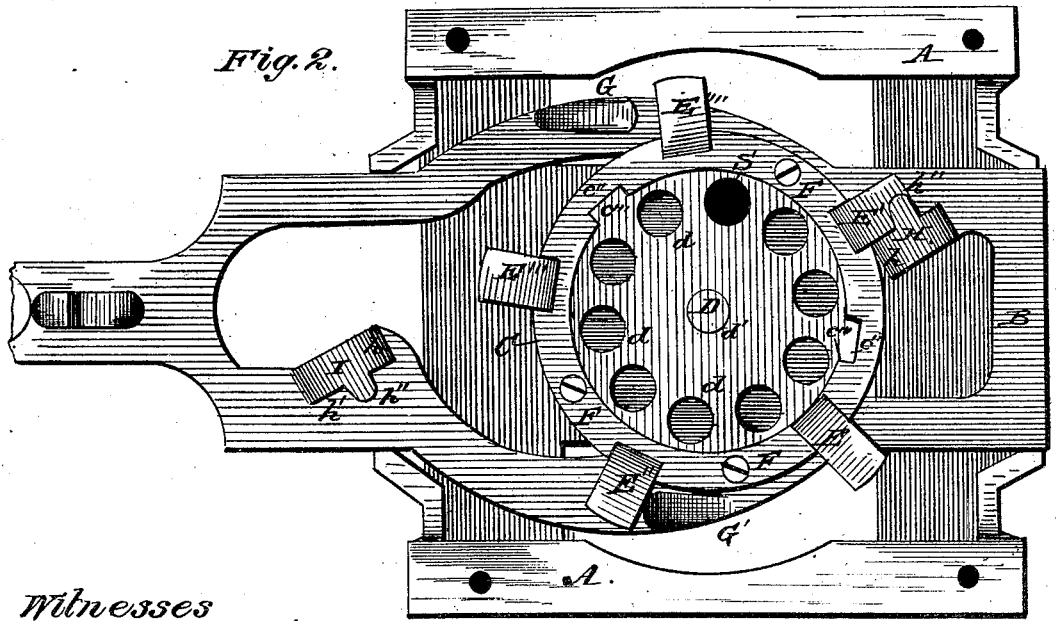
Figure 3:
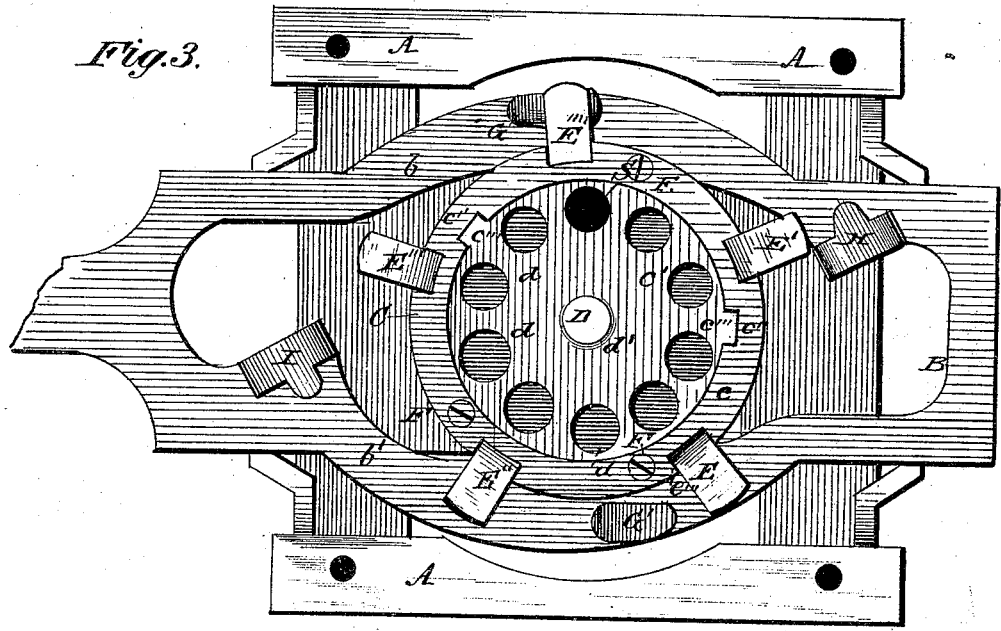

At Fig. 1 the slide B is shown as having completed a throw toward the right-hand side, or in the direction of the arrow 5, where its motion is arrested by any ordinary stop, and in making said throw the tappet G, by contact with a hinged lug, E', gave a partial rotation to the seed-wheel C, and in making said partial rotation the hinged lug E'' swung upwardly and passed up the inclined side of and over the tappet G', as shown at Fig. 3. At the completion of said throw of the slide the lug E''' will come in contact with the vertical side $h'$ of the stop I and arrest the movement of the seed-wheel. The lug E''', it will be seen, also rests beneath the projection $h''$, which will prevent the lug swinging upward to pass over the stop I. As the slide is moved from the position last described to make its throw toward the left-hand side the stop I will be withdrawn from the lug E''', and the tappet G' will act upon the lug E'' and give another partial rotation to the seed-wheel C in the same direction as before, the hinged lug E'''' now swinging upward and passing over the tappet G, and the lug E' coming in contact with the stop H to arrest the movement of the seed-wheel.

The foregoing description of the action of the slide and wheel in throws of the slide in opposite directions will illustrate the method of transmitting an intermittent rotary motion in one direction to the seed-wheel by a reciprocating movement of the slide, and also illustrates the action of the swinging lugs in passing over the tappets G G'.

Figure 4:
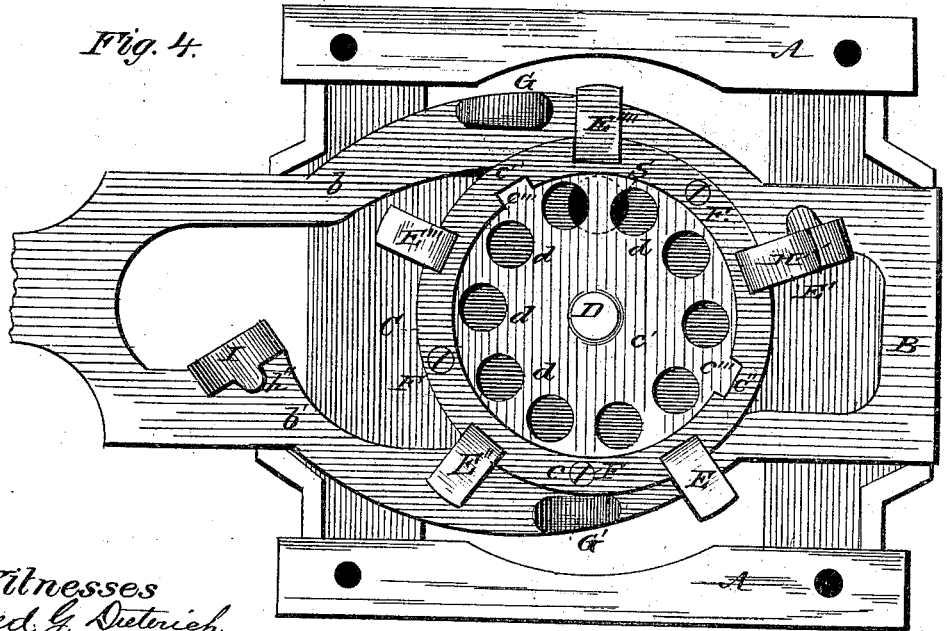

It will be seen that if the slide B is stopped before completing its throw, and in any position whatever of said throw, and its movement reversed, the tappets G G' cannot come in contact with the swinging lugs and lock the slide B and seed-wheel C together; and, further, that if, in making a return throw from a partial throw, one of the hinged lugs should come in contact with a stop, I or H, the hinged lug will pass up the inclined side $h$ of the stop, as shown at Fig. 4, and allow the stroke of the slide to be completed.

The number of swinging lugs may be increased or diminished by increasing or diminishing the number of seed-cup chambers accordingly, and by changing the positions of the stops I and H and tappets G G' to adapt them to the change.

Any ordinary cap and cut-off may be used over the slide and seed-wheel, and none are shown in the drawings.

The seed is discharged through the usual opening S in the bottom A at every throw of the slide.

What I claim as new is—

1. In a corn-planter, a seed-cup wheel having hinged lugs adapted to receive an intermittent motion in one direction from tappets on a reciprocating slide.

2. A corn-planter seed-cup wheel having radial articulating lugs.

3. In combination with the central disk, $c'$, of the seed-cup wheel, the annular plate $c$, formed in two parts, $e'$ $e''$, held together by screws, and adapted to hold the hinged radial lugs, substantially as and for the purpose specified.

4. The ring $c$, constructed in two parts, $e'$ $e''$, having recesses for the hinged radial lugs, and grooves $e''''$, for their journals or trunnions in their adjacent faces, substantially as and for the purpose specified.

5. In combination with the hinged lugs, the ring $c$, having recesses for said lugs, with bottoms which retain the lugs in about horizontal positions when in their normal positions, substantially as and for the purpose specified.

6. In combination, hinged radial lugs and a seed-cup wheel, the lugs hinged thereto so as to permit of oscillating them in vertical planes, and so that they will project in about horizontal planes when in their normal positions, substantially as and for the purpose specified.

7. In combination with a seed-cup wheel having hinged lugs, a slide having tappets, with an inclined side, and a side vertical or nearly so, substantially as and for the purpose specified.

8. The combination, with the seed-cup wheel having hinged lugs, of the slide having tappets adapted to act on the lugs to give motion to the seed-cup wheel, and stops I H, adapted to arrest the movement of said wheel, substantially as and for the purpose specified.

9. In combination with the seed-cup wheel having hinged lugs, the slide having tappets G G', and stops I H, with inclined faces $h$, substantially as and for the purpose specified.

10. The slide having stops I H, with projecting arms $h''$, in combination with the seed-cup wheel having radial hinged lugs, substantially as and for the purpose specified.

11. In combination with a seed-cup wheel constructed substantially as described, lugs placed radially to said seed-cup wheel, and hinged so that they may oscillate in vertical planes, substantially as and for the purpose specified.

12. In combination with a seed-cup wheel having lugs hinged thereto so as to oscillate in vertical planes, a slide having tappets adapted to act on said lugs, to give an intermittent rotary motion to said wheel, and to permit the hinged lugs to pass over them, substantially as described, and for the purpose specified.

13. In combination with a seed-cup wheel having radial hinged lugs, a slide having tappets with inclined and also vertical, or nearly vertical, faces, and stops I H, having inclined and also vertical, or nearly vertical, faces, and a projecting arm, $h''$, substantially as and for the purpose specified.

In testimony whereof I affix my signature in presence of two witnesses.

ANDREW RUNSTETLER.

Witnesses:
H. A. ALLEN,
HARRY M. RICHARDS.

It is hereby certified that in Letters Patent No. 238,160, granted February 22, 1881, to Andrew Runstetler, for an improvement in "Corn Planters," the word "lugs" was erroneously printed "the" before the word "hinged," in line 40 on page 1 of the printed specification attached to and forming a part of said Letters Patent; that the proper corrections have been made in the files and records pertaining to the case in the Patent Office and are hereby made in said Letters Patent.

Signed, countersigned, and sealed this 29th day of March, A. D. 1881.

[SEAL.]

A. BELL,
*Acting Secretary of the Interior.*

Countersigned:
   E. M. MARBLE,
      *Commissioner of Patents.*